United States Patent [19]
Hachgenei et al.

[11] Patent Number: 5,312,603
[45] Date of Patent: May 17, 1994

[54] USING POLYGLYCERINES IN THE BAYER PROCESS TO INCREASE CRYSTAL SIZE OF THE PRODUCT

[75] Inventors: Johannes Hachgenei, Duesseldorf; Reinhard Bunte, Dormagen; Juergen Foell, Duesseldorf, all of Fed. Rep. of Germany

[73] Assignee: Henkel Kommanditgesellschaft auf Aktien, Fed. Rep. of Germany

[21] Appl. No.: 70,364

[22] PCT Filed: Nov. 28, 1991

[86] PCT No.: PCT/EP91/02251

§ 371 Date: Jun. 7, 1993

§ 102(e) Date: Jun. 7, 1993

[87] PCT Pub. No.: WO92/10426

PCT Pub. Date: Jun. 25, 1992

[30] Foreign Application Priority Data

Dec. 7, 1990 [DE] Fed. Rep. of Germany ....... 4039053

[51] Int. Cl.$^5$ ............................................. C01F 7/02
[52] U.S. Cl. ................... 423/122; 423/121; 423/266; 423/625; 423/629; 23/300; 23/305 A
[58] Field of Search ............... 423/625, 629, 121, 122, 423/266; 23/300, 305 A

[56] References Cited

U.S. PATENT DOCUMENTS

| | | | |
|---|---|---|---|
| 2,440,378 | 4/1948 | Newsome et al. | 23/300 |
| 3,575,868 | 4/1971 | Galvin et al. | 423/121 |
| 4,629,618 | 12/1986 | Oguri et al. | 423/625 |
| 4,737,352 | 4/1988 | Owen et al. | 423/625 |
| 4,789,485 | 12/1988 | Feld et al. | 423/122 |
| 5,100,641 | 3/1992 | Schmidt et al. | 423/624 |
| 5,106,599 | 4/1992 | Roe | 23/300 |

FOREIGN PATENT DOCUMENTS

| | | |
|---|---|---|
| 0136512 | 4/1985 | European Pat. Off. . |
| 0271104 | 6/1988 | European Pat. Off. . |
| 0286034 | 10/1988 | European Pat. Off. . |
| 0327660 | 8/1989 | European Pat. Off. . |
| 0465055 | 1/1992 | European Pat. Off. ............ 423/625 |
| 3609662 | 10/1986 | Fed. Rep. of Germany . |

OTHER PUBLICATIONS

*Chemical Abstracts*, vol. 92, No. 12, Mar. 24, 1980, Columbus, Ohio, US; Abstract No. 96203 S, "Crystallization of homogeneously precipitated alumina hydrate gelts in aqueous solutions of various organic reagents", p. 111.

*Ullmanns Encyklopädie der technischen Chemie*, 4. Auflage, Band 7, VCH Weinheim 1982, S. 305 ff.

Büchner, Schliebs, Winter, Büchel, Industrielle anorganische Chemie, VCH Weinheim 1984, pp. 259-260.

Ullmann's Encyclopedia of Industrial Chemistry, vol. A1 (1985), "Aluminum Oxide", p. 557.

*Primary Examiner*—Gary P. Straub
*Assistant Examiner*—N. M. Nguyen
*Attorney, Agent, or Firm*—Ernest G. Szoke; Wayne C. Jaeschke; Norvell E. Wisdom, Jr.

[57] ABSTRACT

The invention concerns the production of aluminum trihydrate crystal by the Bayer process, by digesting ground bauxite, filtering off the red mud, cooling the filtrate, and crystallizing out the dissolved aluminum hydroxide as gibbsite. Before and/or during the crystallization, polyglycerines of the general formula H—($OCH_2CHOH$—$CH_2$)$_n$—OH, where n is an integer equal to or greater than 3, are added.

7 Claims, No Drawings

USING POLYGLYCERINES IN THE BAYER PROCESS TO INCREASE CRYSTAL SIZE OF THE PRODUCT

This application is a 371 of PCT/EP91/02251 filed Nov. 28, 1991, now WO 92/10426, published Jun. 25, 1992.

FIELD OF THE INVENTION

This invention relates to a process for the production of aluminum oxide trihydrate crystals by the Bayer process.

STATEMENT OF RELATED ART

The Bayer process is a process for obtaining aluminum hydroxide from bauxite {Büchner, Schliebs, Sinter, Büchel, *Industrielle anorganische Chemie* [Title in English: Industrial Inorganic Chemistry] (VCH Weinheim 1984), pages 259 and 260; *Ullmanns Encyklopädie der technischen Chemie* [Title in English: Ullmann's Encyclopedia of Industrial Chemistry], 4th Edition, Vol. 7 (VCH Weinheim 1982) pages 305 et seq.} The process comprises the following main steps:

ground bauxite is digested with aqueous sodium hydroxide in an autoclave at temperatures of 140° to 200° C. to form soluble sodium aluminate, iron-containing red sludge is separated off, the filtrate, supersaturated with aluminum hydroxide, is slowly cooled with stirring and seeded with a large quantity of aluminum hydroxide ("stirring-out"), a large part of the dissolved aluminum hydroxide accumulating as gibbsite, the aluminum hydroxide thus obtained is filtered off and the liquor substantially freed from aluminum hydroxide is returned to the process.

Crystallization of the aluminum hydroxide is kinetically inhibited to a considerable extent, so that the precipitation phase is carried out with a gradual reduction in temperature, 10° C. for example, over a period of 24 to 48 h, during which a large quantity of crystal nuclei are added. In addition to crystallization of the aluminum hydroxide, the agglomeration of fine particles to build up relatively large crystal agglomerates is of considerable importance during the stirring-out process. Most of the aluminum hydroxide thus obtained is then calcined to aluminum oxide in another process step.

According to *Aluminumtaschenbuch* [Title in English: Aluminum Handbook], 14th Edition, 1988, page 11, by far the largest part of the oxide produced is processed to metal in aluminum works. A relatively small proportion, including the hydroxide form, is used for various applications in chemistry, ceramics and other fields. The metallurgical oxide has to meet particularly stringent requirements. A moderately calcined oxide having an alpha-$Al_2O_3$ content of less than 30% and very few fines smaller than 45 $\mu$m in size in particularly preferred. Because of this requirement, stringent demands are imposed on the crystallization process, which can be influenced by impurities in the crystallization solution. The impurities in question are, above all, the salts of huminic acids and degradation products thereof, such as sodium oxalate (see DE-A-36 09 662). Sodium oxalate is particularly troublesome because it shows crystallization behavior similar to that of aluminum hydroxide and can even act as a crystallization nucleus. This leads on the one hand to a less pure hydroxide and, on the other hand, to distinctly smaller crystals.

Numerous efforts have been made in the prior art to improve the crystallization of aluminum hydroxide in order to obtain coarser crystals.

U.S. Pat. No. 4,608,237 (DE-A-36 09 662) describes the use of polymers or copolymers of acrylic or methacrylic acid derivatives to influence the crystallization of aluminum hydroxide. U.S. Pat. No. 4,737,352 describes the use of fatty acids in an oil carrier in the Bayer process, which is said to give coarser crystals.

It is known from *Chemical Abstracts* 92 (12), Abstract 96203s, that glycerine distinctly inhibits the crystallization of aluminum hydroxide.

DESCRIPTION OF THE INVENTION

Object of the Invention

Against this background, the problem addressed by the present invention was to improve the known process for the formation of aluminum oxide trihydrate crystals by the Bayer process by making available new crystallization aids for precipitation of the aluminum hydroxide.

SUMMARY OF THE INVENTION

It has surprisingly been found that, even in relatively low concentrations in the crystallization liquor, polyglycerines lead to an aluminum hydroxide precipitate having a distinctly coarser degree of crystallinity compared with the prior art.

In a first embodiment, therefore, the present invention relates to a process for the formation of an aluminum oxide trihydrate crystals by the Bayer process by digestion of crushed bauxite removal of the red mud cooling of the filtrate and crystallization of the dissolved aluminum hydroxide as gibbsite, characterized in that polyglycerines corresponding to general formula (I)

$$H-(OCH_2CHOH-CH_2)_n-OH \qquad (I)$$

in which n is an integer equal to or greater than 3, are added before and/or during the crystallization.

DESCRIPTION OF PREFERRED EMBODIMENTS

The polyglycerines are polyethers having permanent OH functions which are obtained by alkali-catalyzed condensation of glycerine (see, for example, *Ullmanns Encyclopedia of Industrial Chemistry*, 5th Edition, Vol. A12, pages 487–489). As normal in polycondensation reactions, a more or less broad distribution of polymer rather than a certain homolog in pure form is obtained. In this sense, the polyglycerines to be used in accordance with the invention are not individual defined condensation products, in which the index n stands for a certain number, but instead are mixtures of condensation products in which the index "n" indicates the statistical distribution of the polyglycerines present. According to *Ullmanns Encyclopäadie der technischen Chemie*, 4th Edition, Vol. 12, page 374, polyglycerines have relative molecular weights of 166 (6 carbon atoms) to 2238 (90 carbon atoms) and 4 to 32 hydroxyl groups. Although, theoretically, infinitely long polymer chains can be produced, the polycondensation reaction generally stops at shorter chain lengths so that, hitherto, chain lengths below n=50 only have been reported. Since the viscosity of the polyglycerines generally increases with increasing chain length, so that their handling properties deteriorate, a preferred embodiment of the present invention is characterized by the use of polyglycerines corresponding to general formula (I) in which n is a number of 3 to 30. By virtue of their lower viscosity, the relatively short-chain polyglycerines are preferred for the purposes of the invention.

In the same way as monoglycerine itself, diglycerine gives unacceptable particle size distributions, more particularly crystals having a very high percentage of fines. It is assumed that commercially available diglycerine still contains certain amounts of monoglycerine which inhibits the crystallization of aluminum hydroxide. However, it may be assumed that, with increasing degree of condensation, the percentage content of monoglycerine decreases as, hence, does the crystallization inhibiting effect. However, this effect is counteracted by the increased viscosity of the polyglycerines with increasing chain length, so that particularly preferred polyglycerines for the purposes of the invention consist of 3 to 12 glycerine units.

Basically, the quantity of polyglycerines (I) to be used is not critical, but is determined by the technical requirements which the desired crystals is expected to satisfy. A small quantity of polyglycerines corresponding to general formula (I) does not of course influence the crystallization process whereas an excessive quantity of polyglycerines corresponding to general formula (I) on the one hand can lead to a certain contamination of the aluminum hydroxide, but should be avoided on an industrial scale, particularly from the point of view of the economy of the precipitation process, especially when the extremely large conversions are taken into consideration.

Accordingly, one preferred embodiment of the process according to the invention is characterized in that polyglycerines corresponding to general formula (I) are added to the filtrate of the Bayer process in a quantity of 0.01 to 5 g/l. In another preferred embodiment, 0.05 to 2 g/l of the polyglycerines corresponding to general formula (I) is added to the filtrate of the Bayer process.

According to the present invention, any other crystallization aid known from the prior art in addition to the polyglycerines corresponding to general formula (I) may also be used in principle to precipitate aluminum hydroxide. Examples of known crystallization aids are the high molecular weight acrylic or methacrylic acid polymers or copolymers mentioned above or the above-mentioned fatty acids in an oil carrier.

The invention is illustrated by the following Examples.

EXAMPLES AND COMPARISON EXAMPLES

The following Examples and Comparison Examples for studying the influence of the crystallization aids were carried out using controlled liquors from a Bayer process. The liquors had compositions which also occur in industrial processes:
197.3 g/l of Al(OH)$_3$=129 g/l of Al$_2$O$_3$
45.6 g/l of Na$_2$CO$_3$
278.0 g/l of NaOH, 50%, corresponds to 108 g/l of Na$_2$O, 184 g/l of Na$_2$CO$_3$.

These solutions are also characterized by the following data:
Quantitative ratio of Na$_2$O:Al$_2$O$_3$: 1.37
TC (total caustic, free alkalinity): 184 g/l of Na$_2$CO$_3$
TA (total alkali, total alkalinity): 230 g/l of Na$_2$CO$_3$
Al$_2$O$_3$/TC: 0.70.

400 ml of this solution were introduced hot into a double-jacketed spherical flask and, after addition of the particular crystallization aid, were cooled with vigorous stirring from 78° C. to 71° C. over a period of 21 h. The crystalline Al(OH)$_3$ obtained was then filtered off, repeatedly washed and dried in vacuo at 100° C. In all the examples, the yield of crystalline Al(OH)$_3$ was about 30 g, except when glycerine (0.5 g to 400 ml) was added, when a yield of 6 g was obtained. The crystal size distribution was determined by sieving.

The following Table illustrates the superiority of the crystallization aids to be used in accordance with the invention to the prior art in Examples 1 to 6 and Comparison Examples 1 to 3 which were each based on the procedure described above.

| Example | Degree of Condensation of the Polyglycerine (n) | Amount of Polyglycerine in g/400 ml | Percentages by Weight of Al(OH)$_3$ Crystals: | | | |
|---|---|---|---|---|---|---|
| | | | <150 μm | <100 μm | <75 μm | <45 μm |
| 1 | 5 | 0.5 | 36 | 1 | 0.3 | — |
| 2 | 5 | 0.1 | 41 | 3 | 2 | 1 |
| 3 | 5 | 0.05 | 52 | 3 | 2 | 1 |
| 4 | 5 | 0.02 | 70 | 16 | 14 | 8 |
| 5 | 10 | 0.5 | 56 | 7 | 6 | 4 |
| 6 | 10 | 0.1 | 69 | 8 | 7 | 4 |
| Comp. 1 | — | — | 93 | 21 | 17 | 1 |
| Comp. 2 | 1 | 0.5 | 96 | 95 | 92 | 31 |
| Comp. 3 | 2 | 0.5 | 69 | 36 | 35 | 20 |

The above Table shows that even the addition of small quantities of polyglycerines corresponding to general formula (I) to the aluminate liquor leads to a distinct increase in the size of the crystals obtained whereas the addition of glycerine (Comparison Example 2) and diglycerine (Comparison Example 3) leads to only a slight increase in the size of the crystals obtained in relation to Comparison Example 1 where no crystallization aid is added.

The amounts by weight in % by weight in the Table are not standardized to 100% by weight because the sum total of the respective percentages which is smaller than the corresponding size is shown.

The invention claimed is:
1. A Bayer process for the formation of aluminum oxide trihydrate crystals, said process comprising a step of
crystallization of dissolved aluminum hydroxide as gibbsite from a filtrate to produce gibbsite crystals, wherein the improvement comprises adding a crystallization aid consisting essentially of polyglycerines corresponding to general formula (I)

$$H-(OCH_2CHOH-CH_2)_n-OH \quad (I)$$

in which n is an integer equal to or greater than 3, to the filtrate before, during, or both before and during, the crystallization, the gibbsite crystals produced in the process being coarser than when crystallization occurs from an otherwise identical filtrate that contains no polyglycerines.

2. A process as claimed in claim 1, wherein the polyglycerines are selected from the group consisting of those corresponding to general formula (I), when n is a number of 3 to 30.

3. A process as claimed in claim 2, wherein the polyglycerines are selected from the group consisting of those corresponding to general formula (I), when n is a number of 3 to 12.

4. A process as claimed in claim 2, wherein the polyglycerines corresponding to general formula (I) are added to the filtrate in a quantity of 0.01 to 5 g/l.

5. A process as claimed in claim 4, wherein the polyglycerines corresponding to general formula (I) are added to the filtrate in a quantity of 0.05 to 2 g/l.

6. A process as claimed in claim 1, wherein the polyglycerines corresponding to general formula (I) are added to the filtrate in a quantity of 0.01 to 5 g/l.

7. A process as claimed in claim 6, wherein the polyglycerines corresponding to general formula (I) are added to the filtrate in a quantity of 0.05 to 2 g/l.

* * * * *